United States Patent
Al-Solami et al.

(10) Patent No.: US 11,639,290 B2
(45) Date of Patent: May 2, 2023

(54) DRY REFORMING OF METHANE WITH CARBON DIOXIDE AT ELEVATED PRESSURE

(71) Applicant: Saudi Arabian Oil Company, Dhahran (SA)

(72) Inventors: Bandar Al-Solami, Dhahran (SA); Kunho Lee, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 139 days.

(21) Appl. No.: 16/893,261

(22) Filed: Jun. 4, 2020

(65) Prior Publication Data

US 2021/0380408 A1    Dec. 9, 2021

(51) Int. Cl.
*C01B 3/34* (2006.01)
*C01B 3/44* (2006.01)

(52) U.S. Cl.
CPC .......... *C01B 3/44* (2013.01); *C01B 3/34* (2013.01); *C01B 2203/0238* (2013.01); *C01B 2203/1058* (2013.01); *C01B 2203/169* (2013.01); *C01B 2203/1685* (2013.01)

(58) Field of Classification Search
CPC .... C01B 2203/0238; C01B 2203/1276; C01B 2203/1241; C01B 3/34; C01B 2203/1685; C01B 2203/169
See application file for complete search history.

(56) References Cited

U.S. PATENT DOCUMENTS

| | | | |
|---|---|---|---|
| 4,806,699 A * | 2/1989 | Smith | C07C 2/76 585/407 |
| 4,981,676 A | 1/1991 | Minet et al. | |
| 5,229,102 A | 7/1993 | Minet et al. | |
| 5,366,712 A | 11/1994 | Violante | |
| 5,746,985 A | 5/1998 | Takahashi | |
| 5,997,594 A | 12/1999 | Edlund et al. | |
| 6,119,606 A | 9/2000 | Clark | |
| 6,153,163 A | 11/2000 | Prasad | |
| 6,180,081 B1 | 1/2001 | Poschmann et al. | |
| 6,214,485 B1 | 4/2001 | Barnett et al. | |
| 6,296,686 B1 | 10/2001 | Prasad et al. | |
| 6,338,833 B1 | 1/2002 | Aasberg-Petersen | |
| 6,830,596 B1 | 12/2004 | Deckman et al. | |
| 6,960,235 B2 | 11/2005 | Morse et al. | |
| 7,022,165 B2 | 4/2006 | Paglieri et al. | |

(Continued)

FOREIGN PATENT DOCUMENTS

| | | |
|---|---|---|
| AU | 2003286894 | 6/2004 |
| AU | 2005286952 | 3/2006 |

(Continued)

OTHER PUBLICATIONS

PCT International Search Report and Written Opinion in International Appln. No. PCT/US2021/035653, dated Sep. 15, 2021, 14 pages.

(Continued)

*Primary Examiner* — Imran Akram
(74) *Attorney, Agent, or Firm* — Fish & Richardson P.C.

(57) ABSTRACT

A system and method for dry reforming methane at elevated pressure in a dry reformer vessel, and increasing concentration of carbon dioxide in the feed to the dry reformer vessel in response to solid-carbon formation in the dry reformer vessel.

25 Claims, 5 Drawing Sheets

(56) References Cited

U.S. PATENT DOCUMENTS

| | | | |
|---|---|---|---|
| 7,025,941 B1 | 4/2006 | Autenrieth et al. | |
| 7,182,917 B2 | 2/2007 | Krueger | |
| 7,217,304 B2 | 5/2007 | Deckman et al. | |
| 7,323,148 B2 | 1/2008 | Shah et al. | |
| 7,353,982 B2 | 4/2008 | Li | |
| 7,527,661 B2 | 5/2009 | Chellappa et al. | |
| 7,700,005 B2 | 4/2010 | Inui et al. | |
| 7,772,450 B2 | 8/2010 | Iaccino et al. | |
| 7,794,690 B2 | 9/2010 | Abatzoglou et al. | |
| 7,959,897 B2 | 6/2011 | Cui et al. | |
| 8,518,151 B2 | 8/2013 | Tessier et al. | |
| 8,563,185 B2 | 10/2013 | Assink et al. | |
| 8,597,383 B2 | 12/2013 | Pham et al. | |
| 8,900,546 B2 | 12/2014 | Van De Graaf et al. | |
| 9,138,718 B2 | 9/2015 | Li et al. | |
| 9,493,350 B2 | 11/2016 | Morico et al. | |
| 9,499,403 B2 | 11/2016 | Al-Muhaish et al. | |
| 10,478,806 B2 | 11/2019 | Schuetzle et al. | |
| 2003/0041519 A1 | 3/2003 | Maruko | |
| 2003/0172589 A1 | 9/2003 | Krueger | |
| 2003/0175565 A1 | 9/2003 | Noda | |
| 2003/0217511 A1 | 11/2003 | Wada et al. | |
| 2004/0120889 A1 | 6/2004 | Shah et al. | |
| 2005/0045034 A1 | 3/2005 | Paglieri et al. | |
| 2005/0109037 A1 | 5/2005 | Deckman et al. | |
| 2005/0109821 A1 | 5/2005 | Li | |
| 2006/0013759 A1 | 1/2006 | Jiang et al. | |
| 2006/0057060 A1 | 3/2006 | Sun et al. | |
| 2006/0124445 A1 | 6/2006 | Labrecque et al. | |
| 2007/0157517 A1 | 6/2007 | Tsay et al. | |
| 2007/0180991 A1 | 8/2007 | Chellappa et al. | |
| 2008/0021251 A1* | 1/2008 | Iaccino | C07C 2/76 585/316 |
| 2011/0076225 A1 | 3/2011 | Shah et al. | |
| 2011/0177410 A1 | 7/2011 | Assink et al. | |
| 2012/0195824 A1 | 8/2012 | Van De Graaf et al. | |
| 2012/0258037 A1 | 10/2012 | Pham et al. | |
| 2013/0181169 A1* | 7/2013 | Klein | F24S 20/20 422/162 |
| 2014/0051000 A1* | 2/2014 | Ogawa | H01M 8/04425 429/425 |
| 2014/0170061 A1 | 6/2014 | Chaubey et al. | |
| 2014/0363345 A1 | 12/2014 | Li et al. | |
| 2015/0037246 A1 | 2/2015 | Morico et al. | |
| 2016/0214859 A1 | 6/2016 | Beltramini et al. | |
| 2016/0340187 A1 | 11/2016 | Said et al. | |
| 2018/0079643 A1 | 3/2018 | Mortensen et al. | |
| 2018/0272322 A1* | 9/2018 | Carr | B01J 37/08 |
| 2018/0290094 A1* | 10/2018 | Chandran | C10G 2/34 |
| 2020/0269217 A1* | 8/2020 | Ko | B01J 37/00 |

FOREIGN PATENT DOCUMENTS

| | | | |
|---|---|---|---|
| AU | 2005287034 | 3/2006 | |
| AU | 2010291148 | 3/2011 | |
| AU | 2012243063 | 10/2012 | |
| CA | 2458314 | 4/1999 | |
| CA | 2580580 | 3/2006 | |
| CA | 2580585 | 3/2006 | |
| CA | 2414657 | 5/2011 | |
| CA | 2547011 | 8/2011 | |
| CN | 103586030 | 2/2014 | |
| CN | 104098071 | 10/2014 | |
| CN | 104258864 | 1/2015 | |
| CN | 102482079 | 5/2016 | |
| CN | 103596671 | 6/2016 | |
| CN | 105197887 | 3/2017 | |
| CN | 105776133 | 11/2017 | |
| CN | 105561998 | 7/2018 | |
| CN | 110600775 | 12/2019 | |
| EP | 1024111 | 8/2000 | |
| EP | 1294637 | 3/2003 | |
| EP | 1789171 | 5/2007 | |
| EP | 1789172 | 5/2007 | |
| EP | 1828085 | 9/2007 | |
| EP | 1829821 | 9/2007 | |
| EP | 2035329 | 3/2009 | |
| EP | 2696966 | 2/2014 | |
| EP | 2825503 | 1/2015 | |
| EP | 2473441 | 8/2018 | |
| FR | 2943657 | 3/2009 | |
| JP | H 9278403 | 10/1997 | |
| JP | 2943657 | 8/1999 | |
| JP | 2001348205 | 12/2001 | |
| JP | 2004502623 | 1/2004 | |
| JP | 2004249264 | 9/2004 | |
| JP | 2004352528 | 12/2004 | |
| JP | 2005044601 | 2/2005 | |
| JP | 2007190455 | 8/2007 | |
| JP | 2008513337 | 5/2008 | |
| JP | 2008513338 | 5/2008 | |
| JP | 4381033 | 10/2009 | |
| JP | 2010266155 | 11/2010 | |
| JP | 2011195352 | 10/2011 | |
| JP | 2011195387 | 10/2011 | |
| JP | 2011206612 | 10/2011 | |
| JP | 2013503807 | 2/2013 | |
| JP | 5390448 | 10/2013 | |
| JP | 5588581 | 8/2014 | |
| JP | 2014519463 | 8/2014 | |
| JP | 5611627 | 9/2014 | |
| JP | 2014169222 | 9/2014 | |
| JP | 6040701 | 12/2016 | |
| JP | 6345406 | 6/2018 | |
| NO | 200701530 | 4/2007 | |
| NO | 200701532 | 6/2007 | |
| TW | 200619136 | 6/2006 | |
| TW | 200630158 | 9/2006 | |
| WO | WO 2001064577 | 9/2001 | |
| WO | WO 2002002460 | 1/2002 | |
| WO | WO 2002069430 | 9/2002 | |
| WO | WO 2002070402 | 9/2002 | |
| WO | WO 2004041714 | 5/2004 | |
| WO | WO 2005051590 | 6/2005 | |
| WO | WO 2006034086 | 3/2006 | |
| WO | WO 2006034100 | 3/2006 | |
| WO | WO 2006034103 | 3/2006 | |
| WO | WO 2006082933 | 8/2006 | |
| WO | WO 2006097703 | 9/2006 | |
| WO | WO 2007031713 | 3/2007 | |
| WO | WO 2008000782 | 1/2008 | |
| WO | WO 2010109106 | 9/2010 | |
| WO | WO 2011026943 | 3/2011 | |
| WO | WO 2011111554 | 9/2011 | |
| WO | WO-2011111554 A1 * | 9/2011 | ............ C01B 3/384 |
| WO | WO 2012006429 | 1/2012 | |
| WO | WO 2012140995 | 10/2012 | |
| WO | WO-2012140995 A1 * | 10/2012 | ............ B01J 21/10 |
| WO | WO 2012142009 | 10/2012 | |
| WO | WO 2012143096 | 10/2012 | |
| WO | WO 2012158673 | 11/2012 | |
| WO | WO 2013137720 | 9/2013 | |
| WO | WO 2016069385 | 5/2016 | |
| WO | WO 2018129426 | 7/2018 | |
| ZA | 201201141 | 10/2012 | |

OTHER PUBLICATIONS

Arora and Prasad, "An overview on dry reforming of methane: strategies to reduce carbonaceous deactivation of catalysts," RSC Adv., 6, 108668, 2016, 21 pages.

Cimino, "Deploying a solar hybrid technology in a remote oil and gas production site," Journal of the Japan Institute of Energy, 94, 1163-1168, Jan. 2015, 7 pages.

Desouza et al., "Portable Emission Measurement System (PEMS) Testing of a 100KVA Generator using Red Diesel and ISO grade Diesel," King's College London, Encironmental Research Group, Dec. 2016, 12 pages.

Er-rbib et al., "Dry reforming of methane- review of feasibility studies," Chemical Engineering Transactions, vol. 29, 163-168, 2012, 7 pages.

(56) References Cited

OTHER PUBLICATIONS

Fakeeha et al., "Effect of changing CH4/CO2 ratio on hydrogen production by dry reforming reaction," 16th WHEC, 1, 245-256, Jun. 13-16, 2006, 12 pages.
Homerenergy.com (online), "Homer Pro," retireved from URL <https://www.homerenergy.com/products/pro/docs/latest/how_homer_creates_the_generator_efficiency curve.html>, retrieved on Jun. 19, 2020, available on or before Jun. 11, 2020, 1 page.
Ibrahim et al., "Dry reforming of methane using Ce-modified Ni supported on 8% PO4 +ZrO2 catalysts," Catalysts 2020, 10, 242; doi: 10.3390/catal10020242, 16 pages.
Jafarbegloo et al., "One-pot synthesis of NiO—MgO nanocatalysts for CO2 reforming of methane: The influence of active metal content on catalytic performance," J Nat Gas Sci Eng 2015, 27, 1165-1173, 23 pages.
Lavoie, "Review on dry reforming of methane, a potentially more environmentally friendly approach to increasing natural gas exploitation," Frontier in Chemistry, vol. 2, Art. 81, Nov. 2014, 17 pages.
Milanov et al., "Dry Reforming of Methane with CO2 at Elevated Pressures," New Technologies and Alternative Feedstocks in Petrochemistry and Refining DGMK Conference Oct. 9-11, 2013, 5 pages.
Mogensen et al., "Methane Steam Reforming over an Ni—YSZ Solid Oxide Fuel Cell Anode in Stack Configuration,"Journal of Chemistry vol. 2014, Article ID 710391, 9 pages.
Mori et al., "Reactor configuration and concentration polarization in methane steam reforming by a membrane reactor with a highly hydrogen-permeable membrane," Industrial & Engineering Chemistry Research, Feb. 2007, 46(7): 1952-1958.
Oi et al., "Simulation and cost comparison of CO2 liquefaction," Energy Procedia, 2016, 86: 500-510.
Schulz et al., "Dry Reforming of Methane at Elevated Pressures," New Technologies and Alternative Feedstocks in Petrochemistry and Refining DGMK Conference Oct. 9-11, 2013, Dresden, Germany, DGMK—Tagungsbericht Feb. 2013, ISBN 978-3-941721-32-6, 1 page.
Shojaeddini, "Oil and gas company strategies regarding the energy transition," Progress in Energy, Jan. 2001, 2019, 20 pages.
Wismann et al., "Electrified methane reforming: A compact approach to greener industrial hydrogen production," Science Magazine, May 2019, 364(6442): 756-759.
Wolfbeisser et al., "Methane dry reforming over ceria-zirconia supported Ni catalysts," Catal Today vol. 277, Part 2, Nov. 15, 2016, 12 pages.
Xu et al., "An Improved CO2 Separation and Purification System Based on Cryogenic Separation and Distillation Theoty," Energies ISSN 1996-1073, May 2014, 7: 3484-3502.
Zhang et al., "Coke-resistant Ni@SiO2 catalyst for dry reforming of methane," Appl Catal B—Environ 2015, 176, 513-521, 9 pages.

* cited by examiner

DRY REFORMING OF METHANE WITH CARBON DIOXIDE AT ELEVATED PRESSURE

TECHNICAL FIELD

This disclosure relates to dry reforming of hydrocarbon.

BACKGROUND

Carbon dioxide is the primary greenhouse gas emitted through human activities. Carbon dioxide ($CO_2$) may be generated in various industrial and chemical plant facilities. At such facilities, the utilization of $CO_2$ as a feedstock may reduce $CO_2$ emissions at the facility and therefore decrease the $CO_2$ footprint of the facility. The conversion of the greenhouse gas $CO_2$ into value-added feedstocks or products may be beneficial. The dry reforming of methane with $CO_2$ may utilize $CO_2$ as a feedstock. A problem in such dry reforming can be solid-carbon formation in the dry-reformer reactor vessel. The solid carbon or carbonaceous material may be labeled as coke. Thus, the solid-carbon formation may be called coke formation. Deposition of the solid carbon as carbonaceous depositions on the reforming catalyst can reduce catalyst effectiveness and therefore lower conversion of the feed into syngas. Solid-carbon formation can lead to fast degradation of catalysts and cause reactor blockage. Thermodynamically, solid-carbon-formation reaction(s) in the dry reformer vessel can be a favorable reaction.

SUMMARY

An aspect relates to a method of operating a dry reformer system, including providing feed having methane and carbon dioxide to a dry reformer vessel. The method includes converting the methane and the carbon dioxide (e.g., reforming the methane with the carbon dioxide) via reforming catalyst in the dry reformer vessel into syngas at an operating pressure in the dry reformer vessel of at least 20 bar (or at least 25 bar or at least 30 bar) and at an operating temperature in the dry reformer vessel of less than 900° C. (or less than 850° C.). The syngas includes hydrogen and carbon monoxide. The method includes discharging the syngas from the dry reformer vessel. The method includes increasing concentration of carbon dioxide in the feed in response to solid-carbon formation in the dry reformer vessel. The method may include increasing concentration of carbon dioxide in the feed to at least 66 volume percent (vol %) of the feed to inhibit coke formation in the dry reformer vessel. The method may include inhibiting solid-carbon formation in the dry reformer vessel by increasing concentration of carbon dioxide in the feed to at least 66 vol % of the feed.

Another aspect relates to a dry reformer system having a dry reformer vessel. The dry reformer vessel includes: an inlet to receive feed having methane and carbon dioxide; a reforming catalyst to convert the methane and the carbon dioxide into syngas at an operating pressure of at least 20 bar and an operating temperature of less than 900° C.; and an outlet to discharge the syngas into a discharge conduit. The syngas includes hydrogen and carbon monoxide. The dry reformer system includes a flow control valve to control flow rate of carbon dioxide added to the feed. The dry reformer system includes a control system to increase a flow-rate set point of the flow control valve in response to solid-carbon formation in the dry reformer vessel.

The details of one or more implementations are set forth in the accompanying drawings and the description below. Other features and advantages will be apparent from the description and drawings, and from the claims.

DETAILED DESCRIPTION

Figure 1:
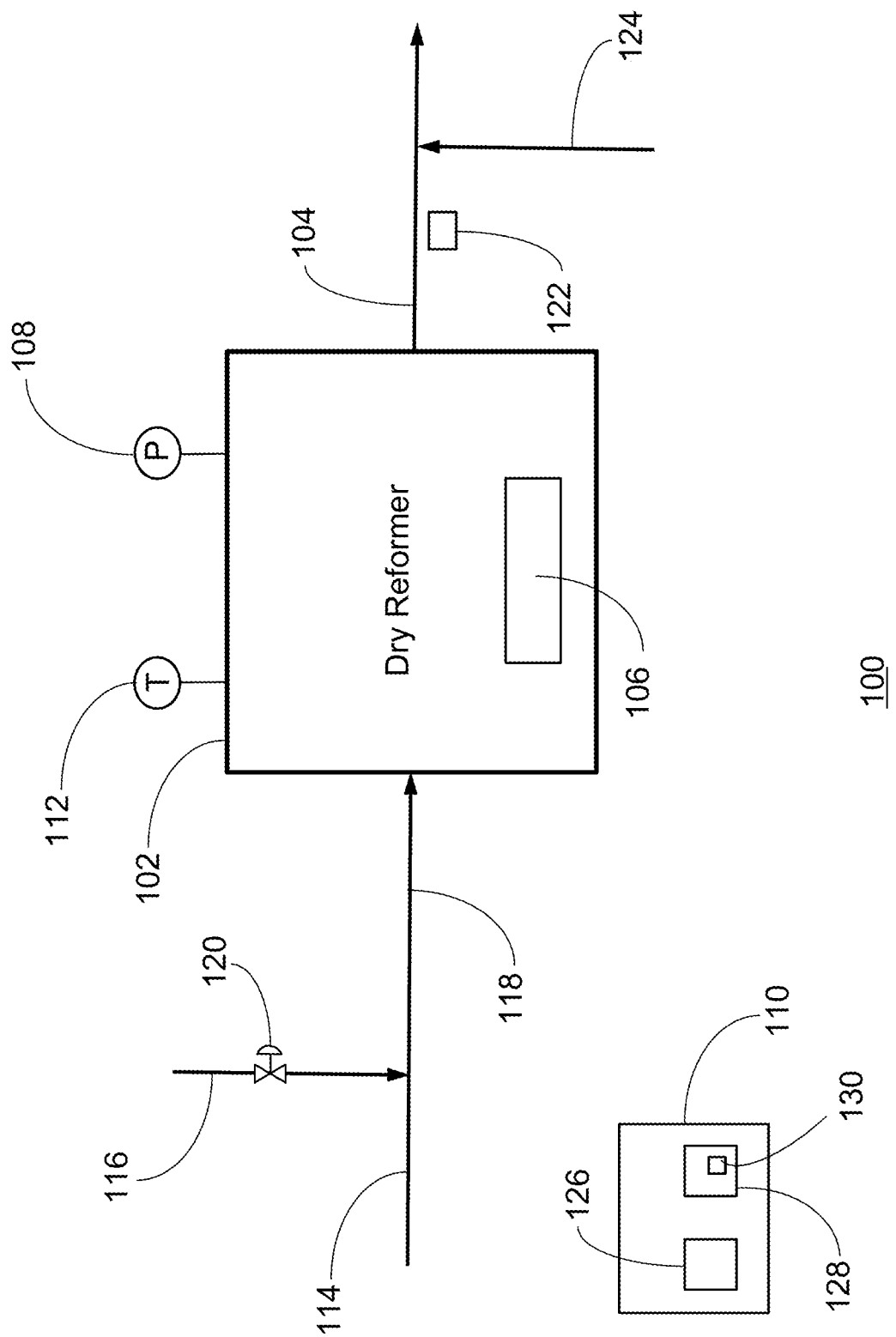
FIG. 1 is a block flow diagram of a dry reformer system.

Some aspects of the present disclosure include operating dry reforming at high pressure (e.g., at least 20 bar) and suppressing solid-carbon formation that may arise due to reforming at high pressure or other reasons. Certain aspects are directed to dry reforming methane at elevated pressure, and increasing concentration of carbon dioxide in the feed to the dry reforming in response to solid-carbon formation.

The dry reforming of methane (with carbon dioxide) under higher pressures may be beneficial and economic, including for downstream processes. Embodiments of the present techniques facilitate stable operation of the dry reformer and reforming catalyst under higher pressures and dry conditions by feeding more carbon dioxide as needed. Therefore, a straightforward process may be advanced involving generally no water or steam addition and optionally direct utilization of syngas in a downstream process. The techniques may produce syngas over extended hours operating under higher pressures. Moreover, by introducing renewable hydrogen into the discharged syngas to adjust (increase) the molar ratio of hydrogen and carbon monoxide, the syngas product can be directly applied in some implementations to certain downstream processes. An example of such a downstream process is hydrocarbon wax/liquid synthesis by a Fischer-Tropsch (FT) system having a FT reactor vessel.

The dry reforming of methane ($CH_4$) with carbon dioxide ($CO_2$) as the oxidant is a technique to beneficially convert the greenhouse-gases $CO_2$ and $CH_4$ into synthesis gas (syngas) that is primarily hydrogen ($H_2$) and carbon monoxide (CO). The molar ratio of the $H_2$ to the CO in syngas produced by dry reforming may typically be approximately 1. Hydrogen may be added to the discharged syngas to increase the molar ratio of $H_2$ to CO if desired. Syngas is a starting building block for many industries and also suitable fuel for electricity generation. Therefore, dry reforming may have benefits for the oil & gas industry, petrochemical industry, power industry, and so forth.

In some implementations of the dry reforming reaction, $CO_2$ and hydrocarbons (e.g., $CH_4$) react at temperatures in a range of 750° C. to 1100° C. with typical dry-reforming catalysts to produce syngas. Certain aspects of the present disclosure are directed to dry reforming of $CH_4$ with a reforming catalyst in a dry reformer reactor at higher pressures (e.g., greater than 20 bar) and at lower temperatures (e.g., less than 900° C.). The oxidant is $CO_2$. The amount (flow rate) of $CO_2$ fed to the dry reformer may be modulated, for example, via a flow control valve.

Operation of the dry reformer at lower temperature may provide process benefits and be more economic. However, operation of the dry reformer at lower temperature may lead to solid-carbon (coke) formation in the dry reformer. Conventionally, operating temperatures above 900° C. for dry reforming have typically been implemented to suppress solid-carbon formation in the dry reformer.

Operation of the dry reformer reactor at higher pressure may provide process benefits. However, operation of the dry reformer at higher pressure may also lead to solid-carbon formation in the dry reformer. The solid-carbon formation reaction may become severe with increasing pressure. Indeed, suppressing the solid-carbon formation at higher pressure may be difficult even at higher temperatures above 900° C. Therefore, dry reforming $CH_4$ at higher pressures has typically not been tenable due to solid-carbon formation in the dry reformer.

However, embodiments herein facilitate dry reforming of $CH_4$ with $CO_2$ and conventional reforming catalyst at higher pressure with suppressed solid-carbon formation. The operating pressure may be, for example, at least 20 bar, at least 25 bar, or at least 30 bar. Embodiments facilitate dry reforming of $CH_4$ with $CO_2$ and conventional catalyst at combined operating conditions of higher pressure and lower temperature with curbed solid-carbon formation. In embodiments, the amount of $CO_2$ fed to the dry reformer is increased in response to solid-carbon formation in the dry reformer. The amount of $CO_2$ fed to dry reformer may be increased to inhibit solid-carbon formation including at higher pressure and lower temperature. See below for the dry-reforming Example performed at 30 bar and 850° C. and giving conversions of $CH_4$ and $CO_2$ at 75% and 65%, respectively, without sign of solid-carbon formation. A conventional nickel-based catalyst was utilized as the reforming catalyst in the Example.

As mentioned, the present techniques provide for operating at elevated pressure in the dry reformer. As also discussed, high pressure may typically cause coke formation even at higher temperatures known to reduce coke formation. The present techniques may operate at the higher pressure without significant coke formation by dynamically varying $CO_2$ content in the feed to the dry reformer in response to detection of presence of coke formation in the dry reformer. The technique may include increasing feed $CO_2$ content to the dry reformer in response to coke formation in the dry reformer. The technique may include specifying increased $CO_2$ in the feed to accomplish reduced coking.

FIG. 1 is a dry reformer system 100 having a dry reformer 102 to produce syngas 104 from hydrocarbon (e.g., $CH_4$) and $CO_2$. The syngas 104 is generally $H_2$ and CO. The dry reformer 102 is a dry reformer reactor that is a vessel having reforming catalyst 106. The dry reforming reaction via the catalyst 106 in the dry reformer 102 may be represented by $CO_2 + CH_4 \rightarrow 2 H_2 + 2 CO$. For dry reforming, the molar ratio of $H_2$ to CO in the syngas 104 based on the ideal thermodynamic equilibrium is 1 but in practice can be, for example, in the range of 0.4 to 1.05. This dry reforming of hydrocarbons, such as $CH_4$, may also be labeled as dry reformation or carbon-dioxide reformation.

The dry reformer 102 vessel may have a pressure sensor 108 to indicate pressure in the vessel that is the operating pressure of the dry reformer 102. The pressure sensor 108 may be, for example, a diaphragm-type. The pressure sensor 108 may indicate the pressure locally, such as via a local pressure gauge. The pressure sensor 108 may send (e.g., via a transmitter) a signal to the control system 110 indicative of the measured pressure. The operating pressure (e.g., at least 20 bar) in the dry reformer 102 is greater than the operating pressure (about 1 bar) of conventional dry reforming. The higher operating pressure as specified herein can provide process benefits. For instance, the higher operating pressure in the dry reformer 102 may facilitate discharge of the syngas 104 to downstream processing equipment without aid of a mechanical compressor.

The dry reformer 102 vessel may have a temperature sensor 112 to indicate temperature in the vessel that is the operating temperature of the dry reformer 102. The temperature sensor 112 may be, for example, a thermocouple inserted into the vessel. In some examples, the thermocouple may reside in a thermowell inserted into the dry reformer 102 vessel. The temperature sensor 112 may indicate the temperature locally, such as via a local temperature gauge. The temperature sensor 112 may send (e.g., via a transmitter) a signal to the control system 110 indicative of the measured temperature. The operating temperature (e.g., less than 900° C.) in the dry reformer 102 may generally be less than the operating temperature of greater than 900° C. that conventional dry reforming implements to suppress coke formation. The lower operating temperature as specified herein can provide process benefits. For instance, the lower operating temperature in the dry reformer 102 may give economic benefit of the dry reforming system 100 utilizing less energy to provide heat for the endothermic dry-reforming reaction in the dry reformer 102.

The present techniques may include specifying (increasing) feed $CO_2$ content to the dry reformer 102 in response to coke formation in dry reformer 102. This can facilitate to operate the dry reformer 102 at elevated pressure without significant coke formation. The increased $CO_2$ in the feed as implemented promotes operation of the dry reformer 102 under higher pressures. The increased $CO_2$ in the feed (without steam) facilitates to operate the dry reformer 102 without coke formation at a pressure, for example, of 30 bar. The technique may include specifying (increasing) feed $CO_2$ content to reduce coke formation.

In operation, feed 114 having $CH_4$ is provided to the dry reformer 102. For example, the feed 114 may be or include natural gas. In other examples, the feed 114 includes $CH_4$ but is not a natural-gas stream. The feed 114 may be a process stream or waste stream having $CH_4$. The feed 114 may include $CH_4$, propane, butane, and hydrocarbons having a greater number of carbons. The feed may 114 include a mixture of hydrocarbons (e.g., C1 to C5), liquefied petroleum gas (LPG), and so on. Additional examples of feed 114 having $CH_4$ are applicable. The feed 114 may include $CO_2$. In some instances, $CO_2$ is added upstream to the feed 114. Thus, in those instances, the upstream feed 114 as provided to the dry reformer system 100 includes $CH_4$ and $CO_2$.

In the illustrated embodiment, carbon dioxide 116 is added to the feed 114 to give the feed 118 introduced to the dry reformer 102. The amount (flow rate) of carbon dioxide 116 added may be controlled by a flow control valve 120 disposed along the conduit conveying the carbon dioxide 116. In other examples, the flow rate of the carbon dioxide 116 may be controlled by an upstream mechanical compressor supplying the carbon dioxide 116. Other flow control elements (devices) are applicable. The flow control valve 120 may interface with the control system 110. In implementations, the flow controller (FC) of the flow control valve 120 may be a component of the control system 110. The flow control valve 120 may be a modulating control valve that maintains or alters the flow rate of the carbon dioxide 116 added to the feed 114. The flow rate controlled may be, for example, mass per time or volume per time. As mentioned, the feed 114 may already have $CO_2$ included or added upstream, and thus in that case, the carbon dioxide 116 added via the control valve 120 is additional $CO_2$.

A feed conduit may convey the feed 114, 118 to the dry reformer 102 vessel. A carbon-dioxide supply conduit may convey the carbon dioxide 116. The carbon-dioxide supply conduit may add the carbon dioxide 116 to the feed 114 by addition of the carbon dioxide 116 to the feed conduit. The flow control valve 120 may be disposed along the carbon-dioxide conduit. In implementations, the dry reformer system 100 does not include a conduit to provide steam to the dry reformer 102 vessel, and the dry reformer 102 vessel does not have an inlet to receive steam.

In certain implementations, the dry reformer vessel has the reforming catalyst to perform dry reforming including to convert the CH4 and the CO2 into syngas at an operating pressure of at least 30 bar and an operating temperature of less than 850° C. In those implementations, the control system 110 in response to solid-carbon formation in the dry reformer 102 increases the flow-rate set point of the flow control valve 120 to increase concentration of CO2 in the feed 118 to at least 66 percent by volume.

The dry reformer system 100 may include instrumentation and meters to indicate flow rates and compositions of the initial feed 114, the carbon dioxide 116 stream, the feed 118 introduced to the dry reformer 102, the discharged syngas 104, and so on. The flow rates and compositions may be indicated to and received by the control system 110. Further, manual sampling and laboratory analysis may be performed to determine composition of the streams. Laboratory analyses results may be input to the control system 110.

In the illustrated embodiment, the dry reformer system 100 may include an online instrument 122 that measures or facilitates determining the composition of the syngas 104. The online instrument 122 may be disposed along the discharge conduit that conveys the syngas 104 discharged from the dry reformer 102 vessel. The online instrument 122 may be, for example, an online gas chromatograph (GC) analyzer. The online instrument 122 may send (e.g., via a transmitter) a signal(s) indicative of the syngas 104 composition to the control system 110. In implementations, the control system 110 may determine (e.g., calculate) the conversion of CH4 (and other hydrocarbon) fed to the dry reformer 102 and conversion of CO2 fed to the dry reformer 102. The determination by the control system 110 of the conversions may be based on and correlative with the amounts (rates) of the CH4 and CO2 fed in the feed 118 to the dry reformer 102 and the amounts (rates) of unreacted CH4 and unreacted CO2 in the syngas 104.

As mentioned, the dry reformer 102 may operate at higher pressure, such as at least 30 bar, to provide process benefit. To advance operation at the higher pressure, the dry reformer system 100 suppresses increased solid-carbon formation that may be experienced with the higher pressure. Solid-carbon formation (or increased solid-carbon formation) in the dry reformer 102 may be determined by sampling the catalyst 106 for carbon deposits. Solid-carbon formation (or increased solid-carbon formation) in the dry reformer 102 may be determined based on (correlative with) operating conditions or worsening operating performance of the reformer 102. For instance, the process condition of decreasing conversions of CH4 and CO2 may be associated with diminished performance of the catalyst 106 and thus indicative of carbon deposition on the catalyst 106. The process condition of decreasing operating temperature or increased amount of energy to heat the dry reformer 102 may be indicative of carbon deposition on the inside walls of the reformer 102 vessel that inhibits heat transfer into the reformer 102 vessel (due to the carbon-fouling of the vessel walls). Another process condition indicative of solid-carbon formation may be the control of the operating pressure of the dry reformer 102 becoming unstable. In other words, the pressure control in the dry reformer 102 may be problematic due to solid-carbon fouling of the catalyst 106, the tube(s) holding the catalyst 106, flow paths in the reformer vessel 102, the reformer 102 vessel outlet for syngas 104, the discharge conduit for the syngas 104, and so forth.

The dry reformer system 100 may accommodate the higher operating pressure that could lead to solid-carbon formation but such solid-carbon formation is prevented or reduced. In particular to prevent or reduce the solid-carbon formation, the amount of carbon dioxide 116 added to the feed 114 may be increased in response to detected presence of solid-carbon formation (or increased solid-carbon formation) occurring in the dry reformer 102 vessel caused by the higher pressure. Solid-carbon formation (or increased solid-carbon formation) may be determined, for example, as discussed above. In response, a human operator may input a higher flow-rate set point into the control system 110 for the flow control valve 120 that modulates (controls) the flow rate of carbon dioxide 116 added to the feed 114. In other instances, the control system 110 in response to detected solid-carbon formation (e.g., caused by the higher operating pressure) may specify and direct an increased flow-rate set point for the flow control valve 120. In one embodiment, the control system 110 increases the flow-rate set point of the flow control valve 120 in response to the conversion of CH4 or the conversion of CO2 dropping below a threshold (e.g., 40%) caused by the fouling of the catalyst due to solid-carbon formation (e.g., associated with the higher operating pressure). The control system 110 may increase the flow-rate set point of the flow control valve 120 in response to increasing pressure in the dry reformer 102 vessel above the specified operating pressure caused by fouling or plugging (due to solid-carbon formation) of flow paths in the vessel or at the discharge of the vessel.

The control system 110 may increase the flow-rate set point of the flow control valve 120 in response to the dry reformer system 100 unable to maintain operating temperature of the dry reformer 102. For example, the control system 110 may increase the flow-rate set point of the flow control valve 120 in response to a process variable of the heat-transfer system (that heats the dry reformer 102) not satisfying a predetermined condition. For instance, failure to meet the predetermined condition may be (1) the process variable of flow rate of a heat-transfer fluid provided through a jacket of the reformer 102 vessel exceeding a value in an effort to maintain the operating temperature, (2) the process variable of the amount of electricity provided to electrical heaters that heat the reformer 102 vessel exceeding a value in an effort to maintain the operating temperature, (3) the process variable of the sheath temperature of the electrical heaters exceeding a value in an effort to maintain the operating temperature, and so on.

The flow rate of the carbon dioxide 116 may be controlled via the flow control valve 120 as depicted. The valve opening (e.g., percent open) of the valve of the flow control valve 120 may be adjusted by a flow controller (FC) to maintain flow rate of the control valve 120 per a flow-rate set point. The set point may be entered to the FC. The set point for the control valve 120 may be manually set locally or manually entered into the control system 110. The specifying of the flowrate of the carbon dioxide 116 may be by the control system 110. The set point for the control valve 120 may be specified by the control system 110 based on feedback from sensors, online analyzer instruments, meters, etc. in the dry reforming system 100. For example, the control system 110 may determine and specify the set point for the control valve 120 based in part on feedback from the online analyzer instrument 122.

The control system 110 may have a controller (e.g., circuitry with executable code) to specify the flow-rate set point of the flow control valve 120. The controller may be labeled, for example, as a suppression controller to suppress coke-formation. The controller may specify (direct) or input the set point to the flow controller (FC) for the flow control valve 120. Thus, the controller may be a master and the FC a slave in a master-slave relationship. The controller may determine presence of solid-carbon formation correlative with operating conditions or performance, and determine the amount of increase to specify to the FC for the flow-rate set point of the flow control valve 120. The controller may be tuned to provide for incremental increase in the set point in combination with on-going feedback.

The dry reformer vessel 102 may be, for example, stainless steel. The dry reformer 102 vessel has one or more inlets to receive the feed 118. The inlet may be, for example, a nozzle having a flange or threaded (screwed) connection for coupling to a feed conduit conveying the feed 118 to the dry reformer 102. The vessel may have an outlet (e.g., a nozzle with a flanged or screwed connection) for the discharge of produced syngas 104 through a discharge conduit for distribution or downstream processing.

The reforming catalyst 106 may be or include, for example, noble metals, nickel (Ni), or Ni alloys. In some embodiments, the catalyst is magnesium oxide (MgO) or MgO nanoparticles. The MgO or MgO nanoparticles may be promoted with Ni and/or molybdenum (Mo), for example.

The dry reformer 102 vessel may be, for instance, a fixed-bed reactor or a fluidized bed reactor. The dry reformer 102 vessel may be a fixed-bed reactor vessel having the reforming catalyst 106 in a fixed bed. In implementations, the fixed-bed reactor vessel may be a multi-tubular fixed-bed reactor. The dry reformer 102 vessel may be a fluidized-bed reactor vessel that operates with a fluidized bed of the reforming catalyst 106.

The feedstock for the dry reforming via the dry reformer 102 may generally be low economic-value streams, such as natural gas (CH4) and CO2. The dry reforming may be a technique for conversion of CO2 and CH4 into syngas without the introduction of steam (water). Implementations are performed without introduction of oxygen. Thus, embodiments of the dry reforming are not steam reforming, not mixed-steam CO2 reforming (MSCR), and not autothermal reforming (ATR).

As indicated, the feed 118 to the dry reformer 102 may include CH4 and CO2. The CO2 116 may be added to the feed 114 as depicted, or the CO2 may be added to the reformer 102 vessel separately from the feed 114. Thus, the CH4 and the CO2 of the feed 118 may be fed in a combined stream as depicted or as separate streams to the dry reformer 102. In one implementation, the feed 118 conduit may include an in-line static mixer to facilitate mixing of the feed 114 (e.g., CH4 stream or natural gas stream, etc.) with the CO2 116 stream (e.g., primarily CO2) to give the feed 118. In particular implementations, the system 100 may include upstream equipment (e.g., desulfurizer, pre-reformer, etc.) to process or treat the feed 114.

The CH4 may be fed as natural gas that includes primarily CH4, for example, at 70-90 mole percent (mol %). Natural gas may include higher alkanes (e.g., ethane, propane, butane) and other components (e.g., nitrogen, H2 sulfide, etc.) at a combined concentration, for example, less than 30 mol %. In certain embodiments, the natural gas includes at least 80 mol % CH4 or at least 90 mol % CH4. The natural gas may be combined with the CO2 116 stream as having primarily CO2 to give the feed 118. In embodiments, the natural gas may have no measurable O2 and/or no measurable water (H2O), or have trace amounts of O2 and/or H2O. Natural gas generally has no more than 1 mole percent (mol %) of O2 and no more than 1 mol % of H2O.

The flow rate (e.g., volumetric rate, mass rate, or molar rate) of the feed 114, 118 may be controlled via at least one flow control valve (disposed along a supply conduit) or by a mechanical compressor, or a combination thereof. The ratio (e.g., molar, volumetric, or mass ratio) in the feed 118 of the CH4 (or natural gas) to the CO2 may be adjusted by modulating (e.g., via one or more control valves) at least one of the flow rates of the CH4 or CO2 streams. As discussed, the amount of CO2 in the feed 118 may be adjusted via the control valve 120 in the illustrated embodiment.

The CO2 content in the feed 118 introduced to the reformer 102 may be at a volume concentration of at least 55%, at least 66%, at least 70%, at least 75%, or at least 80%, or in the ranges of 30% to 70%, 40% to 60%, 45% to 55%, 40% to 75%, 45% to 80%, 55% to 80%, or 60% to 80%, and the like. The CH4 content (or natural gas content) in the feed 118 introduced to the reformer 102 may be at a volume concentration of less than 50%, less than 40%, less than 34%, less than 30%, or less than 20%, or in the ranges of 15% to 70%, 20% to 50%, 20% to 45%, 20% to 40%, 15% to 34%, or 30% to 55%, and the like.

The dry reforming in the dry reformer 102 may be a catalytic reaction where, for instance, the reforming catalyst 106 has a solid oxide support with active metal or metal sites available for the reaction. Again, the feed 118 to the dry reforming includes CH4 and CO2. While O2 is generally not fed to the dry reformer 102, 02 is involved in the dry reforming via the dissociation of the CO2. With respect to the dry reforming mechanism, the dry reforming may disassociate CO2 into O2 and CO. A re-oxidation reaction may occur via the O2 at reduced oxide sites of the catalyst support. The oxygen from the oxide site of the catalyst support can react with CH4 to produce CO and H2 (e.g., 1 mole CO and 2 moles H2 for each mole of CH4) at the thermodynamic equilibrium ratio. The CO and H2 mixed gas may be referred to as the syngas 104.

In certain embodiments, the dry reforming is a fixed-bed catalytic process. As mentioned, the dry reformer 102 may be a fixed-bed reactor that is a vessel having a fixed bed of the reforming catalyst 106. The catalyst 106 may be nickel, nickel alloys, bi-metallic, noble metals, etc. and support, for example by silicon dioxide (SiO2) or aluminum oxide (AlO). In some implementations, the reforming catalyst 106 is nickel catalyst or is MgO nanoparticles promoted with Ni and Mo. In operation for some examples, the feed 118 may be introduced into a bottom portion of the dry reformer 102 reactor and flow upward through the fixed catalyst bed in the dry reformer 102 reactor. In these examples, the syngas 104 may discharge from an upper portion of the reactor above the catalyst bed. In operation for other examples, the feed 118 may be introduced into an upper portion of the dry reformer 102 reactor and flow downward through the fixed catalyst bed in the dry reformer 102 reactor. In these examples, the syngas 104 may discharge from a lower portion of the reactor below the catalyst bed. The molar ratio of H2:CO in the syngas 104 may be in the range of 0.4:1 to 1.05:1. In implementations, the dry reforming may have a feed conversion for both CH4 and CO2 of at least 50%, at least 60%, at least 70%, or at least 80%.

The operating temperature of the dry reformer 102 may be, for example, in a range of 650° C. to 1000° C. or in a range of 700° C. to 900° C. As discussed, the operating temperature may be less than 900° C., less than 850° C., or less than 800° C. The dry reforming reaction may generally be endothermic. The dry reformer 102 reactor vessel may have a jacket for heat transfer and temperature control. In operation, a heat transfer fluid (heating medium) may flow through the jacket for temperature control of the dry reformer 102. Heat transfer may generally occur from the heat transfer fluid in the jacket to the dry-reforming reaction mixture (process side of the dry reformer 102 reactor vessel). In other embodiments, electrical heaters may provide heat for the endothermic dry reforming reaction. The electrical heaters may be disposed in the dry reformer 102 vessel or on an external surface of the dry reformer 102 vessel. In yet other embodiments, the dry reformer 102 vessel may be disposed in a furnace (e.g., a direct fired heater) to receive heat from the furnace for the dry reforming reaction and for temperature control of the dry reformer 102. Other configurations of heat transfer and temperature control of the dry reformer 102 are applicable.

The operating pressure of the dry reformer 102 may be specified to provide for a greater pressure in the dry reformer 102 than in the downstream processing equipment that receives the discharged syngas 104. The downstream operating equipment that receives the syngas 104 may be, for example, a Fischer-Tropsch (FT) reactor or FT system. The operating pressure may be specified to provide for an adequate pressure differential to hydraulically drive the flow of the syngas 104 from the dry reformer 102 through the conduit(s) (piping) to the downstream equipment. The dry reformer 102 operating pressure may be specified to be greater than the downstream equipment (e.g., FT reactor) operating pressure by an amount to overcome the hydraulic resistance to the syngas 104 flow. The hydraulic resistance may be associated with the piping configuration, syngas 104 flow rate, syngas 104 properties, and the like. Depending on the system, the dry reformer 102 operating pressure may be specified and operated, for example, greater than the downstream equipment (e.g., FT reactor) operating pressure by +5 bar, +10 bar, +15 bar, +20 bar, etc. The operating pressure in the dry reformer 102 may be, for example, in the range of 5 bar to 100 bar, 7 bar to 70 bar, 10 bar to 50 bar, or at least 20 bar or at least 30 bar, and so on.

The supply pressure of the feed 118 may facilitate the operating pressure in the dry reformer 102. The header supply pressure of the CH4 or natural gas, the header supply pressure of the CO2, or the header supply pressure of the mixture having the CH4 and CO2 may provide for pressure in the dry reformer 102. In some implementations, an upstream mechanical compressor(s) associated with the feed 114, 116, 118 may provide for the feed supply pressure and operating pressure in the dry reformer 102. In certain examples, a flow control valve may be disposed along the discharge piping conveying the syngas 104 from the dry reformer 102 to the downstream equipment (e.g., FT reactor). The control valve may modulate flow rate of the syngas 104 and facilitate control of operating pressure (e.g., as a backpressure regulator) in the dry reformer 102.

In some embodiments, the operating pressure of the dry reformer 102 may be inadequate as a motive force for flow of the syngas 104 to the downstream processing equipment or distribution. The operating pressure of the dry reformer 102 may be less than the operating pressure of the downstream processing equipment or distribution system. The operating pressure of the dry reformer 102 may less than 10 bar, less than 5 bar, less than 3 bar, or less than 2 bar. In one implementation, a mechanical compressor is disposed along the discharge conduit conveying the syngas 104 to provide a motive force for flow of the syngas 104 from the dry reformer 102 to the downstream processing equipment or distribution.

In implementations, the syngas 104 discharged from the dry reformer 102 may have a molar ratio of H2/CO, for example, of 0.4 to 1.05 and be affected by the thermodynamic equilibrium of the dry reforming. Therefore, supplemental H2 gas 124 may be added to the syngas 104. An increased H2/CO molar ratio may be beneficial for certain downstream processing equipment, such as an FT reactor. In implementations, a flow control valve along the conduit conveying the supplemental H2 gas 124 may modulate the flow rate of the supplemental H2 gas 124 addition to give the desired or specified molar ratio of H2 to CO in the syngas 104 introduced into the downstream system. Moreover, one or more flow control valves may modulate the flow rate of the syngas 104 upstream of the H2 gas 124 addition or downstream of the H2 gas 124 addition. In one embodiment, the supplemental H2 gas 124 is provided by a water electrolysis unit. In implementations, energy for the electrolysis of water in the water electrolysis unit may be provided by renewable sources, such as energy sources relying on wind or solar. The addition of the H2 gas 124 may increase the H2:CO molar ratio, for example, to between 1.2 to 2.5, between 1.5 to 2.5, or between 1.5 to 2.2. A H2 mechanical compressor can be disposed along the conduit conveying the H2 gas 124. The H2 compressor can provide motive force for flow (addition) of the H2 gas 124 into the conduit conveying the syngas 104.

As discussed, the dry reforming system 100 may include a control system 110. The control system 110 may have a processor 126 and memory 128 storing code 130 (e.g., instructions, logic, etc.) executed by the processor 126. The control system 110 may be or include one or more controllers separate from or encompassed by the processor 126 and memory 128. The code 130 may include the logic or instructions for the control system 110 (or a controller of the control system 110) to determine or detect presence of solid-carbon formation in the dry reformer 102, and to specify the increase in the set point of the flow control valve 120.

The processor 126 may be one or more processors and each processor may have one or more cores. The hardware processor(s) 126 may include a microprocessor, a central processing unit (CPU), a graphic processing unit (GPU), a controller card, or other circuitry. The memory 128 may include volatile memory (for example, cache and random access memory (RAM)), nonvolatile memory (for example, hard drive, solid-state drive, and read-only memory (ROM)), and firmware. The control system may include a desktop computer, laptop computer, computer server, programmable logic controller (PLC), distributed computing system (DSC), controllers, actuators, or control cards.

The control system 110 may direct operation of the system 100 or aspects of the system 100. The control system may facilitate or direct processes of the dry reformer system 100 including the dry reformer 102. The control system 110 may receive user input or remote-computer input that specifies the set points of control devices or other control components in the dry reforming system 100. The control system may determine, calculate, and specify the set point of control devices. The determination can be based at least in part on the operating conditions of the system 100 including feedback information from sensors, analyzers, online instruments, and transmitters, and the like, in the dry reformer system 100. The control system 110 may be communicatively coupled to a remote computing system that performs calculations and provides direction. The control system 110 may employ local control panels distributed in the dry reformer system 100.

Certain implementations may include a control room that can be a center of activity, facilitating monitoring and control of the dry reforming system 100 process or facility. The control room may contain a human machine interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data.

Figure 2:
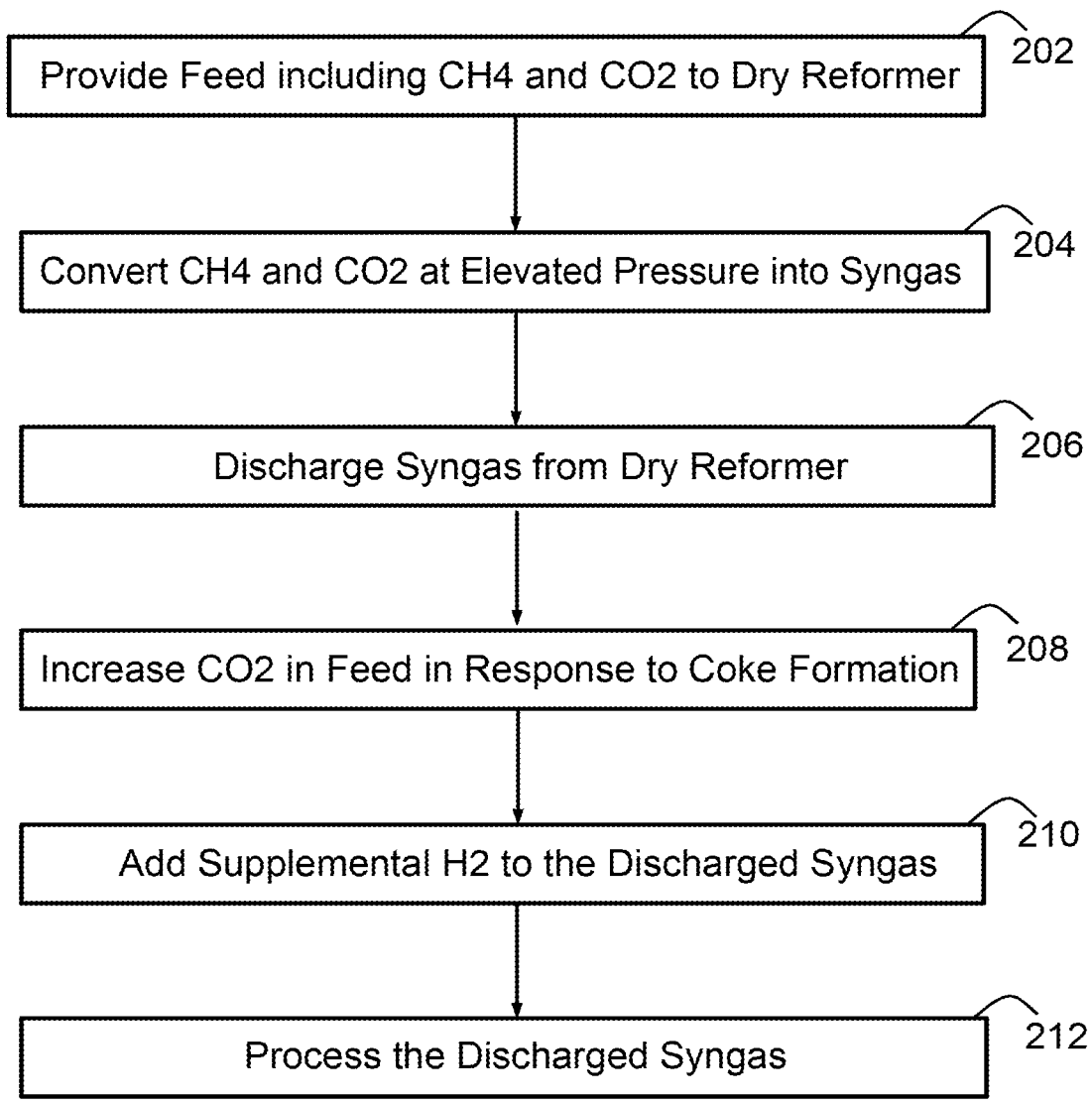
FIG. 2 is a block flow diagram of a method of operating a dry reformer system.

FIG. 2 is a method 200 of operating a dry reformer system having a dry reformer vessel with reforming catalyst. The dry reformer vessel may be a fixed-bed reactor vessel (e.g., multi-tubular fixed-bed reactor) having the reforming catalyst in a fixed bed. In other implementations, the dry reformer vessel may be a fluidized-bed reactor vessel operating with a fluidized bed of the reforming catalyst.

At block 202, the method includes providing feed including $CH_4$ and $CO_2$ to the dry reformer vessel. The feed may include natural gas having the $CH_4$. Steam is generally not added to the dry reformer vessel. In implementations, the feed has less than 1% by volume of oxygen, wherein additional oxygen is not provided to the dry reformer vessel. The feed may have less than 1 mole % of water, and wherein steam is not provided to the dry reformer vessel.

At block 204, the method includes converting (by dry reforming) the $CH_4$ and $CO_2$ via the reforming catalyst in the dry reformer vessel into syngas at an operating pressure in the dry reformer vessel of at least 20 bar and at an operating temperature in the dry reformer vessel of less than 900° C. The reforming of the $CH_4$ generally does not include steam reforming, ATR, or MSCR. The reforming catalyst may include a solid oxide support with an active metal site available for reaction. The reforming catalyst may include nickel or MgO nanoparticles, or a combination thereof. The reforming catalyst may include MgO nanoparticles promoted with nickel and molybdenum. Other types of dry reforming catalyst are applicable.

At block 206, the method includes discharging the syngas from the dry reformer vessel (e.g., into a discharge conduit), such as for distribution or downstream processing. The syngas includes $H_2$ and CO. The molar ratio of $H_2$ to CO in the syngas may be, for example, in a range of 0.4 to 1.05. The method may include measuring composition of the discharged syngas via an online analyzer instrument (e.g., GC analyzer) disposed along a discharge conduit conveying the syngas. One or more signals indicative of the measured composition may be sent to a control system.

At block 208, the method includes increasing concentration of $CO_2$ in the feed in response to solid-carbon formation (e.g., an increased or increasing rate of solid-carbon formation) in the dry reformer vessel. The solid-carbon formation (coke formation) may include carbon deposited on the reforming catalyst. The concentration of the $CO_2$ in the feed is increased to inhibit, suppress, reduce, or prevent coke formation in the dry reformer vessel. The concentration of $CO_2$ may be increased, for example, to at least 66 vol % of the feed. Thus, the method may involve inhibiting solid-carbon formation in the dry reformer vessel by increasing concentration of $CO_2$ in the feed to at least 66 vol % of the feed. In certain implementations, the concentration of the $CO_2$ in the feed is increased to at least 66 vol % in response to the solid-oxide formation, and wherein the operating pressure is at least 30 bar and the operating temperature is less than 850° C. In certain embodiments, the control system may determine the presence of the solid-carbon formation (or increasing solid-carbon formation). In one embodiment, the control system relies on the composition of the discharged syngas as measured (block 206) by the online analyzer instrument to determine the presence of solid-carbon formation.

At block 210, the method may include adding supplemental $H_2$ to the syngas discharged from the dry reformer vessel to increase the molar ratio of $H_2$ to CO in the syngas. For example, the molar ratio may be increased to in the range of 1.5 to 2.5. In one embodiment, the supplemental $H_2$ is provided from a water electrolysis unit. The molar ratio may be increased to facilitate processing of the syngas in downstream equipment.

At block 212, the method may include processing (reacting) the discharged syngas in downstream processing equipment. The downstream processing equipment (e.g., FT reactor) may be operationally coupled to the dry reformer system. The elevated pressure (block 204) in the dry reformer vessel may provide motive force (e.g., without aid of a mechanical compressor) for flow of the discharged syngas from the dry reformer vessel to the downstream processing equipment. The elevated pressure (block 204) may provide motive force flow of the discharged syngas from the dry reformer vessel to downstream distribution (e.g., into a pipeline or compression system) or to a transportation system (e.g., vehicles, containers, etc.).

EXAMPLE

A test of dry reforming $CH_4$ with $CO_2$ was performed in a micro-reactor in the laboratory. The micro-reactor was a stainless-steel tube having a nominal diameter of 9 millimeters (mm). The micro-reactor was mounted in a furnace. The dry-reforming test with the micro-reactor was carried out at 850° C. and 30 bar for 24 hours. The catalyst in the micro-reactor was conventional Nickel-based catalyst. Approximately 1 gram of the catalyst was added to the microreactor. The test included feeding a molar ratio of 1:3 of $CH_4$:$CO_2$ to the micro-reactor for the 24 hours. In particular, a feed of $CH_4$, $CO_2$, and nitrogen ($N_2$) was introduced to the micro-reactor by a mass flow controller for the 24 hours. The ratio $CH_4$:$CO_2$:$N_2$ of the feed in volume percent was 20:60:20. The gas hour space velocity (GHSV) through the catalyst was 1500 $h^{-1}$. The temperature of micro-reactor was increased up to 850° C. at a ramp of 10° C. per minute. The temperature 850° C. was maintained during the reaction. Online gas chromatography was employed to determine composition of the effluent gas discharged from the micro-reactor. Composition of effluent gas was analyzed with online gas chromatography in order to calculate conversions and the $H_2$/CO ratio. Table 1 is a summary of testing conditions and results. The volume percent of $CO_2$ and $CH_4$ in the feed are given on a nitrogen-free basis.

TABLE 1

Example Conditions and Results

| Catalyst | Nickel based catalyst |
|---|---|
| $CO_2$ | 75 vol % in feed |
| $CH_4$ | 25 vol % in feed |

TABLE 1-continued

Example Conditions and Results

| | |
|---|---|
| Temperature | 850° C. |
| Pressure | 30 bar |
| Conversions | CH4: 75%, CO2: 65% |
| H2/CO ratio | ~0.4 molar ratio in effluent |

Figure 3:
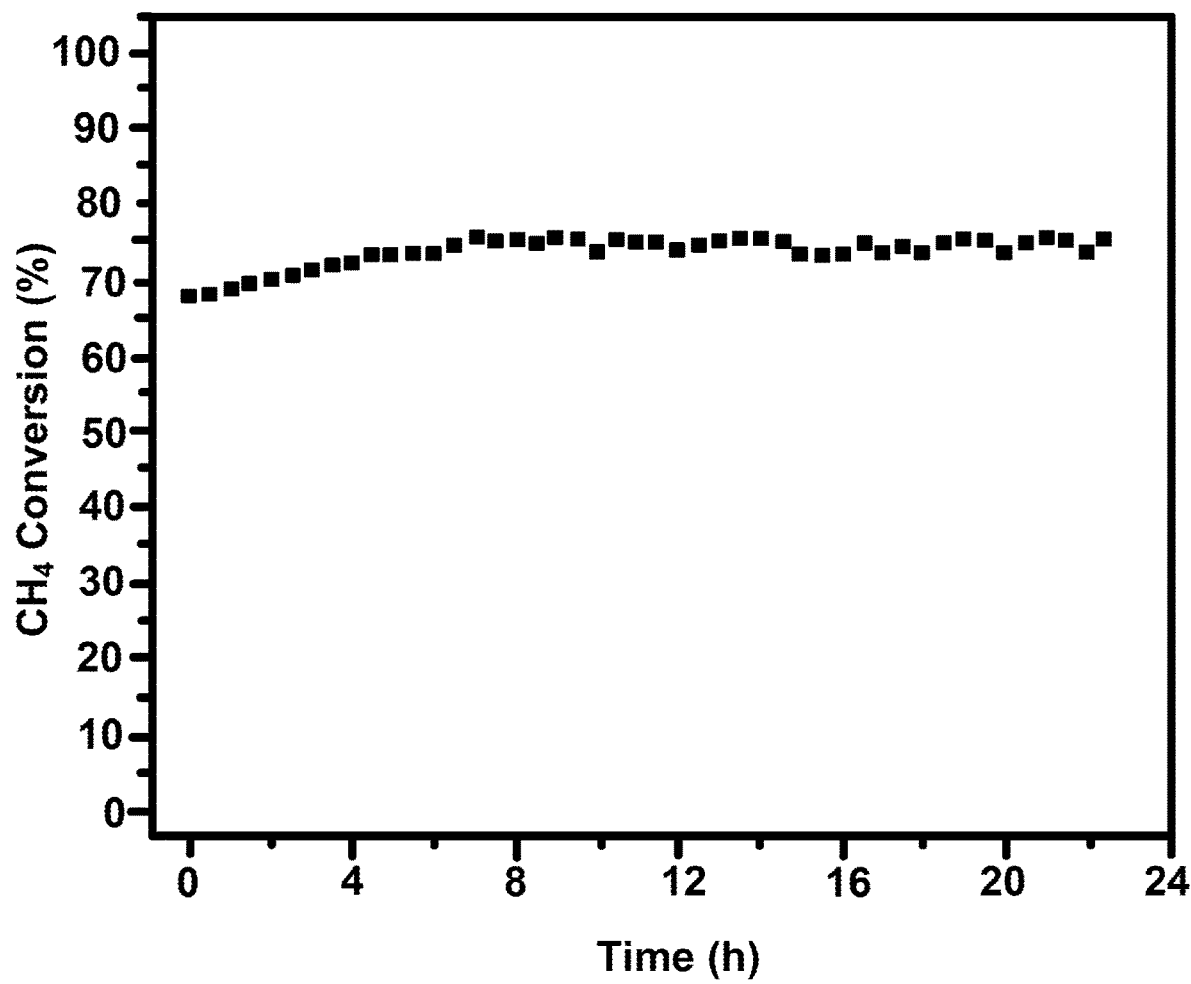
FIGS. 3-5 are plots of results of the Example.
Figure 4:
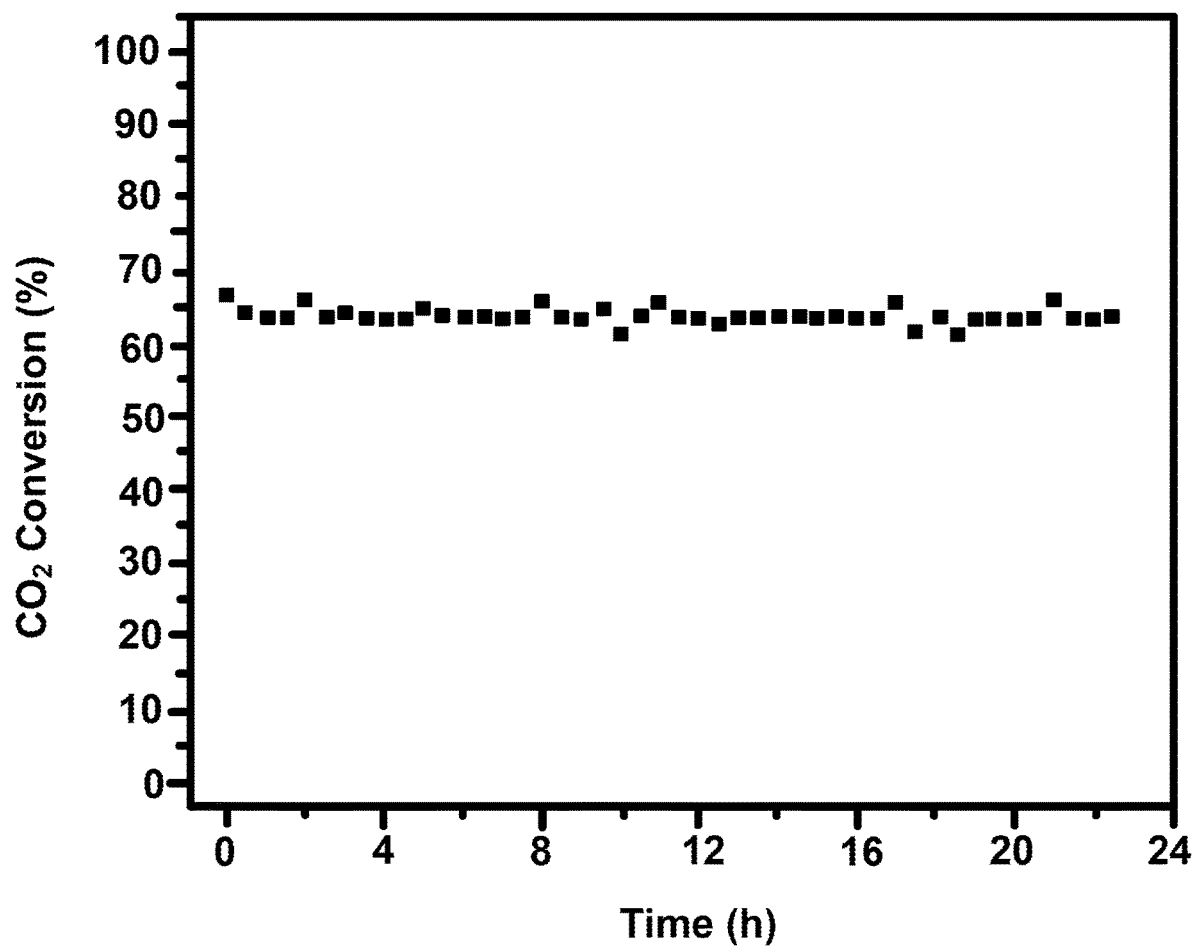
Figure 5:
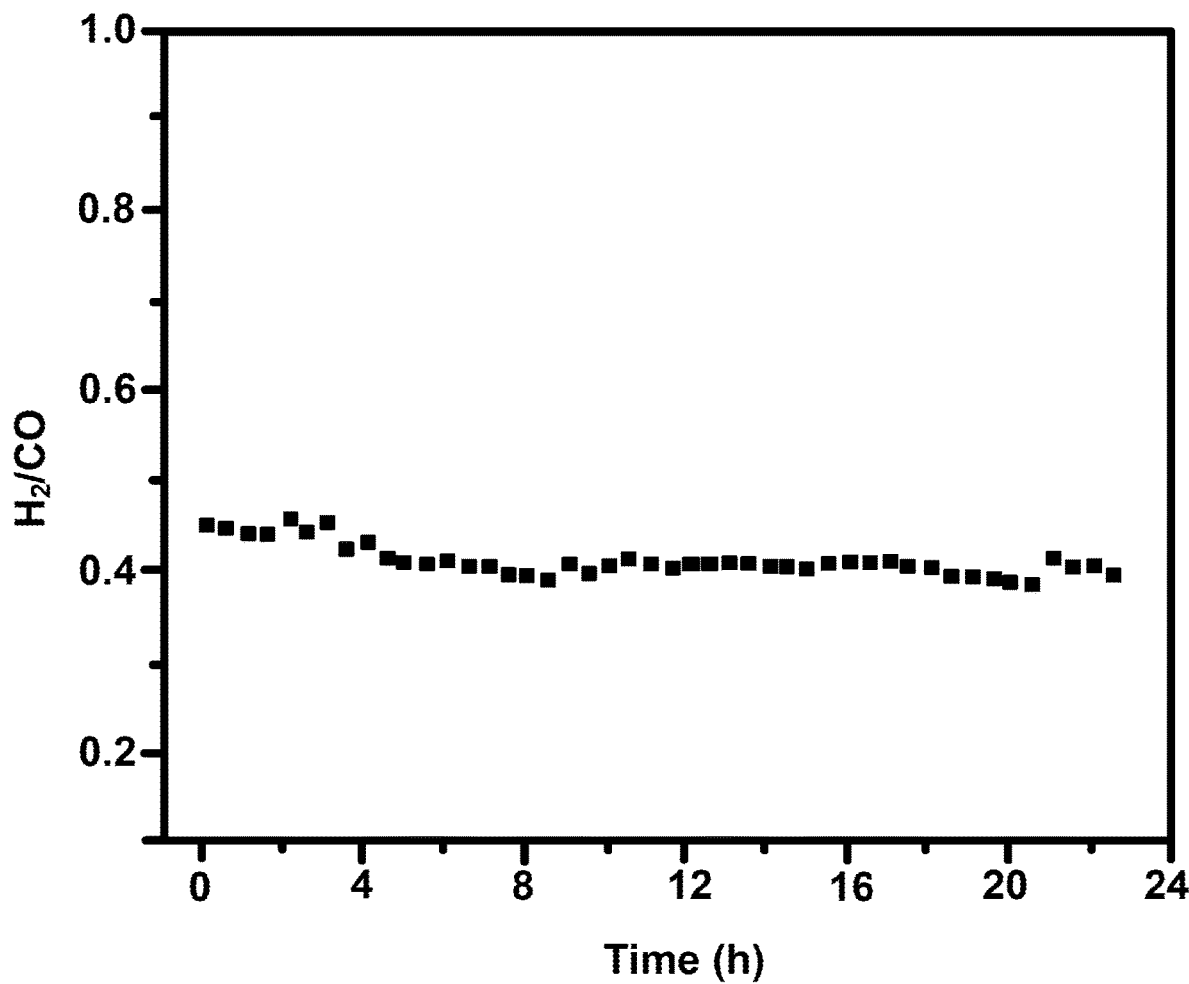

FIG. 3 is a plot of CH4 conversion (%) over time (hours) in the dry reforming reaction of the Example. FIG. 4 is a plot of CO2 conversion (%) over time (hours) in the dry reforming reaction of the Example. FIG. 5 is a plot of the molar ratio of CO/H2 in the effluent over time (hours) in the dry reforming reaction of the Example. As can be seen by the results shown in FIGS. 3-4, the catalyst gave good and stable CH4 and CO2 conversions at 75% and 60%, respectively, at the dry-reforming pressure of 30 bar. No sign of solid-carbon formation was observed. The elevated amount of CO2 in the feed may could introduce the Boudard reaction that may have led to suppressing of solid-carbon formation under the higher pressure at 30 bar.

There are a number of possible side reactions which may occur during the dry reforming of CH4 process. Among those reactions, the solid-carbon formation reaction can be a problematic issue. As discussed, to prevent or reduce the solid carbon formation, high temperatures above 900° C. may be implemented in the dry reformer. However, from a process point of view, operating at lower temperatures can be beneficial and economic. Operating at higher pressures can also be beneficial and economic. Yet, the carbon formation reaction may become severe with increasing pressure and can be difficult to suppress even at high temperatures, which can lead to fast degradation of catalysts and cause reactor blockage. Embodiments herein as described above provide for process conditions under higher pressures giving good conversions, reactor durability, and suppression of carbon formation. Embodiments beneficially provide for higher operating pressure in the dry reformer that advance, for example, discharge of syngas to downstream equipment without the aid of a mechanical compressor. To inhibit solid-carbon formation and thus avoid unwanted deactivation of the reforming catalyst, the techniques may increase CO2 amount to 66-75 (and higher) volume percent in the feed to give stable activity of the catalyst and operation durability under dry reforming reaction conditions including elevated pressure (e.g., at least 20 bar). Other examples may attempt to resolve the issue of solid-carbon formation by focusing on catalyst development with dry reforming at atmospheric pressure. Some examples may implement reforming under higher pressures but with steam (H2O) addition to suppress carbon formation and which means the operating condition is not dry. The present reforming may avoid steam methane reforming and utilize CO2 as an oxidant. This may promote to utilize CO2 as a feedstock and thus reduce CO2 footprint.

An embodiment is a dry reformer system having a dry reformer vessel. The dry reformer vessel includes: an inlet to receive feed including CH4 and CO2; a reforming catalyst (e.g., in a fixed bed) to convert the CH4 and the CO2 into syngas at an operating pressure of at least 20 bar and an operating temperature of less than 900° C.; and an outlet to discharge the syngas into a discharge conduit, wherein the syngas includes H2 and CO. The syngas discharged from the dry reformer vessel may have a molar ratio of H2 to CO, for example, in a range of 0.4 to 1.05. In certain implementations, the reforming catalyst has a solid oxide support. The reforming catalyst may be a nickel catalyst or nickel-based catalyst. The reforming catalyst may include MgO nanoparticles. The MgO nanoparticles may be promoted with nickel and molybdenum. The dry reformer vessel may be a fixed-bed reactor vessel (e.g., multi-tubular fixed-bed reactor) having the reformer catalyst in a fixed bed. In other implementations, the dry reformer vessel is a fluidized-bed reactor vessel to operate with a fluidized bed of the reforming catalyst.

The dry reformer system includes a flow control valve to control (modulate, regulate, maintain, adjust, alter, etc.) flow rate of CO2 added to the feed. The dry reformer system includes a control system to increase a flow-rate set point of the flow control valve in response to solid-carbon formation in the dry reformer vessel. In a particular implementation, the dry reformer vessel converts the CH4 and the CO2 into syngas at an operating pressure of at least 30 bar and an operating temperature of less than 850° C., and wherein the control system to increase the flow-rate set point of the flow control valve to increase concentration of CO2 in the feed to at least 66 percent by volume. The dry reformer system may include a feed conduit to convey the feed to the dry reformer vessel, and a conduit (carbon-dioxide supply conduit) to convey the CO2 added to the feed by addition of the CO2 to the feed conduit, wherein the flow control valve is disposed along the conduit. In implementations, the dry reformer system does not include a conduit to provide steam to the dry reformer vessel, and the dry reformer vessel does not have an inlet to receive steam. The control system may determine presence of the solid-carbon formation in the dry reformer vessel correlative with feedback received by the control system from the dry reforming system. The feedback may be, for example, indicative of an operating condition of the dry reformer system or indicative of performance of the dry reformer system, or a combination thereof. In some implementations, the feedback includes indication of composition of the discharged syngas from an online instrument analyzer disposed along the discharge conduit. In one implementation, the online instrument analyzer includes an online GC analyzer.

A number of implementations have been described. Nevertheless, it will be understood that various modifications may be made without departing from the spirit and scope of the disclosure.

What is claimed is:

1. A method of operating a dry reformer system, comprising:
providing feed comprising methane and carbon dioxide to a dry reformer vessel;
converting the methane and the carbon dioxide via reforming catalyst in the dry reformer vessel into syngas at an operating pressure in the dry reformer vessel of at least 20 bar and at an operating temperature in the dry reformer vessel of less than 900° C., the syngas comprising hydrogen and carbon monoxide;
discharging the syngas from the dry reformer vessel;
adding, via a control system and a first flow control valve, hydrogen ($H_2$) gas to the syngas as discharged to increase a molar ratio of hydrogen ($H_2$) to carbon monoxide in the syngas, wherein the first flow control valve is disposed along a conduit conveying the $H_2$ gas;
detecting presence of solid-carbon formation in the dry reformer vessel by evaluating conversion stability of the dry reformer vessel;
increasing concentration of carbon dioxide in the feed by increasing, via the control system and a second flow control valve, flow rate of carbon dioxide fed to the dry reformer vessel in response to detecting the presence of solid-carbon formation in the dry reformer vessel and to suppress the solid-carbon formation; and suppressing solid-carbon formation in the dry reformer vessel by the increasing concentration of carbon dioxide in the feed, wherein increasing the concentration of carbon dioxide in the feed suppresses solid-carbon formation in the dry reformer vessel, wherein the feed comprises less than 1% by volume of oxygen, wherein additional oxygen is not provided to the dry reformer vessel, wherein the feed comprises less than 1 mole % of water, and wherein steam is not provided to the dry reformer vessel.

2. The method of claim 1, wherein increasing the concentration of carbon dioxide comprises increasing the concentration of the carbon dioxide in the feed to at least 66 volume percent (vol %) of the feed in response to solid-carbon formation in the dry reformer vessel, wherein the operating pressure is at least 25 bar, and wherein the operating temperature is less than 850° C.

3. The method of claim 1, comprising controlling pressure in the dry reformer vessel via a control valve disposed along discharge piping conveying the syngas discharged from the dry reformer vessel, wherein the control valve comprises a backpressure regulator, wherein discharging the syngas comprises discharging the syngas for distribution or downstream processing, and wherein the dry reformer vessel comprises a fixed-bed reactor vessel comprising the reforming catalyst in a fixed bed.

4. The method of claim 3, comprising:
specifying the molar ratio of hydrogen ($H_2$) to carbon monoxide in the syngas;
determining composition of the syngas via an online instrument disposed along a discharge conduit conveying the syngas discharged from the dry reformer vessel, wherein adding the hydrogen ($H_2$) gas to the syngas comprises adjusting an amount of the hydrogen ($H_2$) gas added to the syngas to give the molar ratio of hydrogen ($H_2$) to carbon monoxide as specified, wherein the downstream processing comprises a Fischer-Tropsch (FT) system having a FT reactor vessel, and wherein the fixed-bed reactor vessel comprises a multi-tubular fixed-bed reactor.

5. The method of claim 1, wherein the dry reformer vessel comprises a fluidized-bed reactor vessel operating with a fluidized bed of the reforming catalyst.

6. The method of claim 1, wherein detecting the presence of the solid-carbon formation is further by determining conversion in the dry reformer vessel of the methane fed to the dry reformer vessel, determining conversion in the dry reformer vessel of the carbon dioxide fed to the dry reformer vessel, or determining an amount of energy applied to heat the dry reformer vessel, or any combinations thereof.

7. A method of operating a dry reformer system, comprising:
providing feed comprising methane and carbon dioxide to a dry reformer vessel;
converting the methane and the carbon dioxide via reforming catalyst in the dry reformer vessel into syngas at a pressure in the dry reformer vessel of at least 20 bar and at a temperature in the dry reformer vessel of less than 850° C., the syngas comprising hydrogen and carbon monoxide;
discharging the syngas from the dry reformer vessel;
specifying the pressure in the dry reformer vessel to be greater than in downstream equipment that receives the syngas as discharged;
operating the dry reformer vessel at the pressure as specified via a control system and a control valve, wherein the control valve is disposed along discharge piping conveying the syngas discharged from the dry reformer vessel;
detecting presence of increasing coke formation in the dry reformer vessel by determining conversion in the dry reformer vessel of the methane or the carbon dioxide, or both, fed to the dry reformer vessel;
increasing, via the control system, concentration of carbon dioxide in the feed to at least 66 volume percent (vol %) of the feed by increasing, via a flow control valve, flow rate of carbon dioxide fed to the dry reformer vessel to inhibit coke formation in the dry reformer vessel in response to detecting presence of increasing coke formation in the dry reformer vessel; and
inhibiting coke formation in the dry reformer vessel by increasing the concentration of carbon dioxide in the feed, wherein increasing the concentration of carbon dioxide in the feed inhibits coke formation in the dry reformer vessel, wherein the feed comprises less than 1% by volume of oxygen, wherein additional oxygen is not provided to the dry reformer vessel, wherein the feed comprises less than 1 mole % of water, and wherein steam is not provided to the dry reformer vessel.

8. The method of claim 7, wherein the downstream equipment comprises distribution equipment or a Fischer-Tropsch (FT) reactor, wherein detecting the presence of increasing coke formation is further by evaluating conversion stability of the dry reformer vessel or by evaluating an operating variable of heating the dry reformer vessel, or a combination thereof, and wherein the feed comprises natural gas comprising the methane.

9. The method of claim 7, wherein operating the dry reformer vessel at the pressure as specified via the control system and the control valve comprises modulating flow rate of the syngas via the control valve disposed along the discharge piping conveying the syngas as discharged from the dry reformer vessel, wherein the control valve comprises a backpressure regulator that facilitates control of the pressure in the dry reformer vessel, wherein the coke formation comprises carbon deposited on the reforming catalyst, and wherein the reforming catalyst comprises a solid oxide support with an active metal site available for reaction.

10. A method of operating a dry reformer system, comprising:
providing feed comprising methane and carbon dioxide to a dry reformer vessel;
dry reforming the methane with the carbon dioxide via reforming catalyst in the dry reformer vessel to convert the methane and the carbon dioxide into syngas at a pressure in the dry reformer vessel of at least 20 bar and at a temperature in the dry reformer vessel of less than 850° C., the syngas comprising hydrogen and carbon monoxide;
discharging the syngas from the dry reformer vessel;
specifying the pressure in the dry reformer vessel to be greater than in downstream equipment that receives the syngas;
operating the dry reformer vessel at the pressure as specified, thereby providing motive force via pressure differential for flow of the syngas from the dry reformer to the downstream equipment;

adding supplemental hydrogen gas via a control system and a first flow control valve to the syngas, thereby increasing a molar ratio of hydrogen ($H_2$) to carbon monoxide in the syngas;

detecting presence of solid-carbon formation in the dry reformer vessel by determining an amount of energy applied to heat the dry reformer vessel or by evaluating an operating variable of heating the dry reformer vessel, or a combination thereof;

increasing, via the control system, concentration of carbon dioxide in the feed by increasing, via a second flow control valve, flow rate of carbon dioxide fed to the dry reformer vessel in response to detecting presence of solid-carbon formation in the dry reformer vessel and to inhibit solid-carbon formation in the dry reformer vessel; and inhibiting solid-carbon formation in the dry reformer vessel by increasing the concentration of carbon dioxide in the feed, wherein increasing the concentration of carbon dioxide inhibits solid-carbon formation in the dry reformer vessel, wherein the feed comprises less than 1% by volume of oxygen, wherein additional oxygen is not provided to the dry reformer vessel, wherein the feed comprises less than 1 mole % of water, and wherein steam is not provided to the dry reformer vessel.

11. The method of claim 10, comprising controlling the pressure in the dry reformer vessel via a control valve disposed along discharge piping conveying the syngas discharged from the dry reformer vessel, wherein the control valve comprises a backpressure regulator, wherein the concentration of carbon dioxide in the feed is increased to at least 66 volume percent (vol %) of the feed, wherein reforming the methane does not comprise steam reforming, wherein reforming the methane does not comprise autothermal reforming (ATR), and wherein reforming the methane does not comprise mixed-steam carbon dioxide reforming (MSCR).

12. The method of claim 11, wherein detecting the presence of the solid-carbon formation is further by determining composition of the syngas as discharged, and wherein the syngas as discharged from the dry reformer vessel comprises the molar ratio of hydrogen ($H_2$) to carbon monoxide of at least 0.4.

13. The method of claim 12, wherein adding the supplemental hydrogen gas to the syngas discharged from the dry reformer vessel increases the molar ratio of hydrogen ($H_2$) to carbon monoxide in the syngas to in a range of 1.5 to 2.5, wherein determining the composition of the syngas as discharged comprises determining the composition via an online analyzer instrument disposed along a discharge conduit conveying the syngas discharged from the dry reformer vessel.

14. A method of operating a dry reformer system, comprising:

providing feed comprising methane and carbon dioxide to a dry reformer vessel;

converting the methane and the carbon dioxide via reforming catalyst in the dry reformer vessel into syngas comprising hydrogen and carbon monoxide;

discharging the syngas from the dry reformer vessel;

modulating, via a control system, flow rate of the syngas by a control valve disposed along discharge piping conveying the syngas as discharged from the dry reformer vessel;

detecting presence of solid-carbon formation in the dry reformer vessel by determining composition of the syngas;

increasing, via the control system, concentration of carbon dioxide in the feed by increasing, via a flow control valve, flow rate of carbon dioxide fed to the dry reformer vessel in response to detecting the presence of solid-carbon formation and to inhibit the solid-carbon formation; and inhibiting the solid-carbon formation by the increasing of the concentration of carbon dioxide in the feed, wherein the feed comprises less than 1% by volume of oxygen, wherein additional oxygen is not provided to the dry reformer vessel, wherein the feed comprises less than 1 mole % of water, and wherein steam is not provided to the dry reformer vessel.

15. The method of claim 14, comprising adding hydrogen gas to the syngas, thereby increasing a molar ratio of hydrogen ($H_2$) to carbon monoxide in the syngas, wherein operating pressure in the dry reformer vessel is at least 20 bar, and wherein operating temperature in the dry reformer vessel is less than 900° C.

16. The method of claim 14, wherein detecting the presence of solid-carbon formation comprises detecting increasing solid-carbon formation in the dry reformer vessel, and wherein detecting the increasing solid-carbon formation is further by evaluating conversion stability of the dry reformer vessel, evaluating conversion of carbon dioxide in the dry reformer vessel, evaluating conversion of methane in the dry reformer vessel, determining an amount of energy applied to heat the dry reformer vessel, or evaluating an operating variable of heating the dry reformer vessel, or any combinations thereof.

17. The method of claim 14, wherein detecting the presence of solid-carbon formation is further by evaluating conversion stability of the dry reformer vessel, determining conversion in the dry reformer vessel of the methane fed to the dry reformer vessel, determining conversion in the dry reformer vessel of the carbon dioxide fed to the dry reformer vessel, determining an amount of energy applied to heat the dry reformer vessel, or evaluating an operating variable of heating the dry reformer vessel, or any combinations thereof.

18. The method of claim 14, wherein detecting the presence of the solid-carbon formation is further by evaluating conversion stability of the dry reformer vessel, thereby detecting the presence of the solid-carbon formation in the dry reformer vessel.

19. The method of claim 14, wherein detecting the presence of the solid-carbon formation is further by determining conversion in the dry reformer vessel of the methane or the carbon dioxide, or both, fed to the dry reformer vessel, to detect the presence of the solid-carbon formation in the dry reformer vessel.

20. The method of claim 14, wherein detecting the presence of the solid-carbon formation is further by determining an amount of energy applied to heat the dry reformer vessel or evaluating an operating variable of heating the dry reformer vessel, or a combination thereof, thereby detecting the presence of the solid-carbon formation in the dry reformer vessel.

21. The method of claim 14, wherein determining the composition of the syngas comprises determining the composition of the syngas via an online analyzer instrument disposed along a discharge conduit conveying the syngas discharged from the dry reformer vessel.

22. The method of claim 14, wherein determining the composition comprises manually collecting a sample of the syngas as discharged from the dry reformer vessel and performing laboratory analysis of the sample to determine the composition.

23. The method of claim 14, comprising controlling pressure in the dry reformer vessel via the control valve disposed along discharge piping conveying the syngas discharged from the dry reformer vessel, wherein the control valve comprises a backpressure regulator.

24. The method of claim 14, comprising:
adding hydrogen ($H_2$) gas to the syngas; and
adjusting an amount of the hydrogen gas added to the syngas, thereby adjusting a molar ratio of hydrogen ($H_2$) to carbon monoxide in the syngas, wherein determining composition of the syngas determining the composition of the syngas via an online instrument disposed along a discharge conduit conveying the syngas discharged from the dry reformer vessel.

25. The method of claim 14, comprising:
specifying the pressure in the dry reformer vessel to be greater than in downstream equipment that receives the syngas to provide motive force for flow of the syngas from the dry reformer to the downstream equipment; and
operating the dry reformer vessel at the pressure as specified, thereby providing the motive force via pressure differential for flow of the syngas from the dry reformer to the downstream equipment.

* * * * *